United States Patent [19]
Hofer et al.

[11] Patent Number: 5,521,261
[45] Date of Patent: May 28, 1996

[54] EPOXY RESIN MIXTURES CONTAINING ADVANCEMENT CATALYSTS

[75] Inventors: Arnold Hofer, Muttenz, Switzerland; Hildegard Schneider, Steinen, Germany; Nikolaus Siegenthaler, Basel, Switzerland

[73] Assignee: Ciba-Geigy Corporation, Tarrytown, N.Y.

[21] Appl. No.: 250,125

[22] Filed: May 27, 1994

[51] Int. Cl.⁶ .......................... C08G 59/68; C08G 59/04; C08G 59/06
[52] U.S. Cl. .................. 525/523; 528/89; 528/91; 528/94; 528/92
[58] Field of Search .................. 525/523; 528/89, 528/91, 94, 92

[56] References Cited

U.S. PATENT DOCUMENTS

| | | | |
|---|---|---|---|
| 4,465,722 | 8/1984 | Fiaux et al. | 528/88 |
| 4,885,354 | 12/1989 | Hofer et al. | 528/94 |
| 4,925,901 | 5/1990 | Bertram et al. | 528/91 |
| 4,973,648 | 11/1990 | Hofer et al. | 528/94 |
| 5,006,626 | 4/1991 | Hofer et al. | 528/94 |
| 5,015,676 | 5/1991 | Macholdt et al. | 523/453 |
| 5,019,639 | 5/1991 | Hofer et al. | 528/94 |

FOREIGN PATENT DOCUMENTS

| | | |
|---|---|---|
| 0315084 | 5/1989 | European Pat. Off. . |
| 0314619 | 5/1989 | European Pat. Off. . |
| 0328020 | 8/1989 | European Pat. Off. . |
| 0362140 | 4/1990 | European Pat. Off. . |
| 0362138 | 4/1990 | European Pat. Off. . |
| 0391370 | 10/1990 | European Pat. Off. . |

OTHER PUBLICATIONS

Chemical Abstr., 72:79776.
Chemical Abstracts 110:8219, "Preparation of N-Containing Heterocyclic Tetrafluoroborates", Mori et al.
Chemical Abstracts 89:152639, "Organic Ammonium Salts", Veselouska et al.

*Primary Examiner*—Frederick Krass
*Attorney, Agent, or Firm*—William A. Teoli, Jr.

[57] ABSTRACT

Epoxy resin compositions comprising an epoxy resin which is liquid at room temperature and has on average more than one epoxy group per molecule and a quaternary perhydroazepinium salt or a quaternary octahydroazocinium salt as advancement catalyst, when advanced with compounds having two phenolic hydroxyl groups, give excellent products having low viscosity and good viscosity stability, which products can be used, for example, for surface protection, preferably as binder for coatings and paints.

8 Claims, No Drawings

EPOXY RESIN MIXTURES CONTAINING ADVANCEMENT CATALYSTS

The present invention relates to epoxy resin mixtures which can be advanced in the presence of perhydroazepinium salts or octahydroazocinium salts and to the use of these salts as advancement catalysts for epoxy resins.

Advancement of epoxy resins is in general understood to mean chain-lengthening of epoxy resins associated with an increase in the molecular weight. Of relevance is in particular the selectivity of the catalyst used whose function is to ensure that linear, i.e., non-branched polyhydroxy ethers are produced.

Many compounds have already been proposed or described as catalysts for the advancement of liquid epoxy resins. However, some of them are not selective and result in the abovementioned branching or even in crosslinking of the oligomers already formed.

U.S. Pat. No. 4,465,722 discloses, for example, tetraalkylammonium hydroxides or tetraalkylammonium halides as advancement catalysts.

In European Patent Applications 0 314 619; 0 362 138 and 0 362 140, quaternary piperidinium salts, quaternary pyrrolidinium salts and quaternary morpholinium bromides and morpholinium iodides are used as advancement catalysts. These advancement catalysts produce advanced epoxy resins which, although being distinguished by low viscosity and high linearity, exhibit a viscosity build-up which when exposed to thermal stress such as may occur, for example, during slow discharge of a product batch from the reactor is still too high.

It has now been found that the use of specific quaternary perhydroazepinium salts (hexamethyleneammonium salts or quaternary salts of hexamethyleneimine) and quaternary octahydroazocinium salts (heptamethyleneammonium salts) for the advancement of liquid epoxy resins produces advanced epoxy resins which do not have the abovementioned disadvantage.

Accordingly, the present invention relates to an epoxy resin composition comprising an epoxy resin which is liquid at room temperature and has an on average more than one epoxy group per molecule and a quaternary perhydroazepinium salt or a quaternary octahydroazocinium salt as advancement catalyst.

Suitable epoxy compounds are in particular those whose molecular weight is relatively low, for example diglycidyl compounds having a molecular weight of less than 3500, in particular of less than 2000, preferably between 175 and 350. The preferably used diglycidyl compounds can be glycidyl ethers or glycidyl esters; furthermore, the glycidyl groups can also be linked to nitrogen atoms. Examples of suitable phenols on which the ethers are based include the following: mononuclear diphenols, such as resorcinol, naphthalenes having two hydroxyl groups, such as 1,4-dihydroxynaphthalene, biphenyls and other binuclear aromatic compounds having a methylene, isopropylidene, —O—, —SO$_2$—, or —S— bridge and containing two hydroxyl groups attached to the aromatic rings, such as, in particular, bisphenol A, bisphenol F or hisphenol S; the benzene rings can also contain halogen atoms, such as tetrabromobisphenol A. Also suitable are aliphatic dihydroxy compounds, for example 1,4-butanediol or polyether glycol. Examples of compounds which serve as the base for the glycidyl esters are phthalic acid, terephthalic acid, tetrahydrophthalic acid, hexahydrophthalic acid, adipic acid, trimethyladipic acid or sebacic acid. Mononuclear hydantoins containing glycidyl groups attached to the nitrogen atoms, such as N,N'-diglycidylhydantoins, are also suitable. Other glycidyl compounds of nitrogen-containing tings are those of 5,6-dihydrouracils or barbitufic acids.

These are known and mainly commercially available epoxy compounds.

According to the invention, for example, perhydroazepinium salts or octahydroazocinium salts having the formula I or II

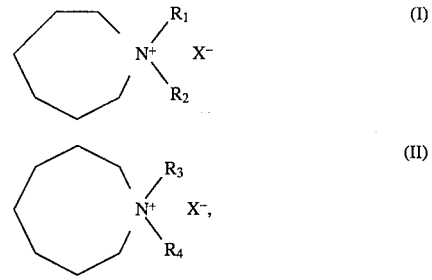

are used, in which $R_1$ is $C_1$–$C_8$alkyl and $R_2$ is $C_1$–$C_8$alkyl, $C_1$–$C_8$hydroxyalkyl, $C_1$–$C_8$alkoxyalkyl, $C_1$–$C_8$alkoxyhydroxyalkyl, $C_1$–$C_8$alkenyl, $C_1$–$C_8$alkoxycarbonylalkyl, $C_1$–$C_8$alkylcarbonylalkyl, $C_7$–$C_9$phenylalkyl or $C_7$–$C_9$phenylhydroxyalkyl, $R_3$ is $C_1$–$C_8$alkyl and $R_4$ is $C_1$–$C_8$alkyl, $C_1$–$C_8$hydroxyalkyl, $C_1$–$C_8$alkoxyalkyl, $C_1$–$C_8$alkoxyhydroxyalkyl, $C_1$–$C_8$alkenyl, $C_1$–$C_8$alkoxycarbonylalkyl, $C_1$–$C_8$alkylcarbonylalkyl, $C_7$–$C_9$phenylalkyl or $C_7$–$C_9$phenylhydroxyalkyl, and X is a halogen atom, acetate, $BF_4$, $PF_6$, $AsF_6$ or $SbF_6$.

Suitable perhydroazepinium salts or octahydroazocinium salts are preferably those in which in formula I or II $R_1$ and $R_2$ are identical and are each $C_1$–$C_8$alkyl, $R_3$ and $R_4$ are identical and are each $C_1$–$C_8$alkyl, and X is a halogen atom.

Suitable $C_1$–$C_8$alkyl radicals, preferably $C_1$–$C_4$alkyl radicals, are methyl, ethyl, 1-propyl, 1-n-butyl, 1-n-hexyl or 1-n-octyl. These radicals can carry a hydroxyl group, in particular in the 2 position, if present. $R_1$ and $R_2$ and $R_3$ and $R_4$ are in particular identical and are methyl, ethyl, 1-propyl or 1-n-butyl, and X is bromine or iodine.

$C_1$–$C_8$Alkoxyhydroxyalkyl designates radicals which contain not only an ether function but also a hydroxyl group, for example 2-hydroxy-3-butoxypropyl.

$R_2$ and $R_4$ as alkenyl can be, for example, allyl or methallyl. Further examples of $R_2$ and $R_4$ are acetonyl, acetoxyethyl or 2-hydroxy-2-phenylethyl.

X as halogen is preferably iodine, bromine or chlorine, in particular bromine or iodine.

Preferably, the epoxy resin compositions according to the invention contain a perhydroazepinium salt of the formula I.

The epoxy resin compositions according to the invention contain, as perhydroazepinium salt of the formula I, in particular N,N-dimethylperhydroazepinium iodide, N,N-diethylperhydroazepinium iodide, N,N-dipropylperhydroazepinium iodide, N-n-butyl-N-ethylperhydroazepinium bromide or N-n-butyl-N-n-propylperhydroazepinium iodide.

The compounds of the formulae I and II are known and can be prepared in a known manner by reacting, for example, perhydroazepine (hexamethyleneimine) or azacyclooctane (heptamethyleneimine) with a substituted or unsubstituted alkyl halide in a molar ratio of 1:2. Differently substituted compounds of the formula I or II can likewise be prepared in a known manner by reacting, for example, an $R_1$- or $R_3$-substituted perhydroazepine or azacyclooctane with a substituted or unsubstituted alkyl halide in a molar ratio of about 1:1. In this context, see the preparation examples.

The perhydroazepinium salts and octahydroazocinium salts to be used according to the invention are employed in catalytically active amounts, for example in an amount of about 2 to 2000 ppm (parts per million), preferably 10–700 ppm, and in particular 30–500 ppm, relative to the weight of the base resin.

The advancement process is carried out in a known manner, for example by reacting the epoxy resin with compounds preferably containing two phenolic hydroxyl groups, the epoxy resin being present in molar excess and the reaction being generally carried out at elevated temperature, for example at 150°–220° C., preferably at 160°–200° C.

In this process, any aromatic compounds known in the advancement technique and preferably containing two phenolic hydroxyl groups can be used. Examples include mononuclear diphenols (such as resorcinol), naphthalenes having two hydroxyl groups, such as 1,4-dihydroxynaphthalene, biphenyls and other binuclear aromatic compounds having a methylene, isopropylidene, —O—, —$SO_2$— or —S— bridge and containing two hydroxyl groups attached to the aromatic rings, such as, in particular bisphenol A, bisphenol F or bisphenol S; the benzene rings can also contain halogen atoms, such as tetrabromobisphenol A.

The amount of phenol depends upon which product is desired. In general, the larger the amount, the higher the molecular weight of the end product. This will also lead to an increase in the melting point and to a change in the physical and chemical properties of the resin obtained.

The advancement processes and their implementation are known and described, for example, in U.S. Pat. Nos. 3,275,708 and 4,465,722.

The corresponding reaction is carried out, for example, at a temperature of 100°–220° C., preferably 120°–190° C., and a pressure of 10–1000 mbar, preferably 200–800 mbar.

The advanced epoxy resins obtained in this manner are distinguished by a high stability of the epoxy number and the viscosity upon exposure to thermal stress. Moreover, these resins have a low viscosity which is favourable for further processing. It has been found that the advancement catalysts to be used according to the invention exhibit a constant activity in the reaction and, owing to their high selectivity, lead to substantially linear products. Moreover, it is not necessary to use a chain terminator. If desired, in order to carry out the advancement in an optimum manner, it is also useful to use a monofunctional chain terminator, for example a phenol. The catalysts are effective in relatively small amounts, the reaction proceeds rapidly, and only a slight tendency to undergo undesirable phenol cleavage can be observed. This manifests itself in good colour characteristics of the products.

The cured end products prepared by crosslinking the advanced epoxy resins with customary curing agents for epoxy resins, such as acid anhydrides, polyamines, polyhydric phenols, and the like, possess good flexibility.

The products can be used for surface protection, for producing castings, in particular in the electric sector, prepregs and laminates.

Particular mention may be made of their use as binders for coatings and paints, in particular for stoving lacquers.

Preparation of the advancement catalysts

EXAMPLE A

N,N-Di-n-butylperhydroazepinium iodide

A 750 ml sulfonating flask equipped with stirrer, thermometer, reflux condenser, dropping funnel and thermostat equipped with oil bath is charged with 23.2 ml (0.2 mol) of perhydroazepine (hexamethyleneimine), 100 ml of methyl isobutyl ketone, and 22 g of sodium carbonate. 45.7 ml (0.4 mol) of 1-butyl iodide and 100 ml of methyl isobutyl ketone are then added dropwise over a period of 30 minutes while stirring the mixture. After 30 minutes, the reaction mixture is diluted with 80 ml of methanol and allowed to react at 60° C. for 6 hours. The reaction mixture is then filtered, and the residue is washed three times with 50 ml of methanol. The filtrate is concentrated on a rotary evaporator. The resulting crystalline paste is filtered off with suction, recrystallized from methyl isobutyl ketone, and dried in a vacuum oven at 50° C. Yield: 59% of theory. Melting point: 156°–158° C.

EXAMPLE B

N,N-Di-n-propylperhydroazepinium iodide

The procedure described in Example A is repeated, using now 39.0 ml (0.4 mol) of 1-propyl iodide instead of 1-butyl iodide. Yield: 63% of theory. Melting point: 160°–162° C.

EXAMPLE C

N,N-Diethylperhydroazepinium iodide

The procedure described in Example A is repeated, using now 32.3 ml (0.4 mol) of ethyl iodide instead of 1-butyl iodide. The reaction time at 60° C. is 8 hours. Yield: 73% of theory. Melting point: 226° C.

EXAMPLE D

N,N-Dimethylperhydroazepinium iodide

The procedure described in Example A is repeated, using now 25.0 ml (0.4 mol) of methyl iodide instead of 1-butyl iodide. Yield: 72% of theory. Melting point: 281° C.

EXAMPLE E

N,N-Di-n-butylperhydroazepinium bromide

The procedure described in Example A is repeated, using now 44.0 ml (0.4 mol) of 1-butyl bromide instead of 1-butyl iodide. In addition, the flask is now charged with 24 g of sodium carbonate instead of 22 g. Yield: 46% of theory. Melting point: 186° C.

EXAMPLE F

N,N-Di-1-propylperhydroazepinium bromide

The procedure described in Example A is repeated, using now 38.0 ml (0.4 mol) of 1-propyl bromide instead of 1-butyl iodide. In addition, the flask is now charged with 24 g of sodium carbonate instead of 22 g, and the reaction time at 60° C. is 10 hours. Yield: 66% of theory. Melting point: 226° C.

EXAMPLE G

N,N-Diethylperhydroazepinium bromide

The procedure described in Example A is repeated, using now 30.0 ml (0.4 mol) of ethyl bromide instead of 1-butyl iodide. In addition, the flask is now charged with 24 g of sodium carbonate instead of 22 g and with 150 ml of methyl isobutyl ketone instead of 100 ml, and the reaction solution is diluted with 100 ml of methanol. The reaction time at 60°

C. is 10 hours. Yield: 78% of theory. Melting point: 212° C.

EXAMPLE H

N,N-Diethyloctahydroazocinium iodide

The procedure described in Example A is repeated, using now 13.1 ml (0.1 mol) of azacyclooctane (heptamethyleneimine), 16.2 ml (0.2 mol) of ethyl iodide, 12 g of sodium carbonate, and 60 ml of methanol as diluent. The reaction time at 65° C. is 10 hours. Yield: 75% of theory. Melting point: 222° C.

EXAMPLE I

N,N-Di-n-propyloctahydroazocinium iodide

Example H is repeated, using now 19.5 ml (0.2 mol) of 1-propyl iodide instead of ethyl iodide and 12 g of sodium carbonate. Yield: 63% of theory. Melting point: 96° C.

EXAMPLE J

N,N-Di-n-butyloctahydroazocinium bromide

Example H is repeated, using now 44 ml (0.2 mol) of 1-butyl bromide instead of ethyl iodide, 60 ml of methyl isobutyl ketone and 60 ml of methanol as diluent. The reaction time at 70° C. is 15 hours. Yield: 43% of theory. Melting point: 200° C.

EXAMPLE K

N-n-Butyl-N-ethylperhydroazepinium iodide

In a sulfonating flask of 1000 ml capacity equipped with stirrer and dropping funnel, the following substances are mixed in the same order:
- 100 ml of methyl isobutyl ketone (MIBK),
- 30.2 g of N-n-butylhexamethyleneimine, and
- 39.3 g of ethyl iodide (from dropping funnel).

The mixture is heated with stirring to 50° C., as a result of which the mixture turns cloudy after a few minutes, and a crystalline paste separates after an extended period of time. After a reaction time of 6 hours, the crystalline paste is filtered off with suction, washed with MIBK, and dried in vacuo. Yield: 42.6 g (69% of theory), melting point: 227° C.

EXAMPLE L

N-n-Butyl-N-methylperhydroazepinium iodide

In a sulfonating flask of 1000 ml capacity equipped with stirrer and dropping funnel, the following substances are mixed in the same order:
- 100 ml of methyl isobutyl ketone (MIBK),
- 30.2 g of N-n-butylhexamethyleneimine, and
- 39.3 g of methyl iodide (from dropping funnel).

The mixture is heated with stirring to 40° C., as a result of which the mixture turns immediately cloudy, and a crystalline paste separates after a short period of time. After a reaction time of 6 hours, the crystalline paste is filtered off with suction, washed with MIBK, and dried in vacuo. Yield: 52.7 g (90% of theory), melting point: 216° C.

EXAMPLE M

N-n-Butyl-N-n-propylperhydroazepinium iodide

In a sulfonating flask of 1000 ml capacity equipped with stirrer and dropping funnel, the following substances are mixed in the same order:
- 100 ml of methyl isobutyl ketone (MIBK),
- 30.2 g of N-n-butylhexamethyleneimine, and
- 39.3 g of 1-propyl iodide (from dropping funnel).

The mixture is heated with stirring to 60° C., as a result of which the mixture turns cloudy after a few minutes, and a crystalline paste separates after an extended period of time. After a reaction time of 7 hours, the crystalline paste is filtered off with suction, washed with MIBK, and dried in vacuo. Yield: 30.6 g (48% of theory), melting point: 222° C.

EXAMPLE N

N-n-Butyl-N-n-propylperhydroazepinium iodide

In a sulfonating flask of 1000 ml capacity equipped with stirrer and dropping funnel, the following substances are mixed in the same order:
- 100 ml of methyl isobutyl ketone (MIBK),
- 30.2 g of N-n-butylhexamethyleneimine, and
- 30.8 g of 1-propyl iodide (from dropping funnel).

The mixture is heated with stirring to 70° C., as a result of which the mixture turns cloudy after a few minutes, and a crystalline paste separates after an extended period of time. After a reaction time of 9 hours, the crystalline paste is filtered off with suction, washed with MIBK, and dried in vacuo. Yield: 18.0 g (33% of theory), melting point: 229° C.

EXAMPLE O

N-n-Butyl-N-ethylperhydroazepinium bromide

In a sulfonating flask of 1000 ml capacity equipped with stirrer and dropping funnel, the following substances are mixed in the same order:
- 100 ml of methyl isobutyl ketone (MIBK),
- 30.2 g of N-n-butylhexamethyleneimine, and
- 39.3 g of ethyl bromide (from dropping funnel).

The mixture is heated with stirring to 50° C., as a result of which the mixture turns cloudy after a few minutes, and a crystalline paste separates after an extended period of time. After a reaction time of 10 hours, the crystalline paste is filtered off with suction, washed with MIBK, and dried in vacuo. Yield: 33.0 g (63% of theory), melting point: 207° C.

Procedure of the Advancement Process

In Examples 1 to 10 below, epoxy resins having the desired epoxide content of about 0.6 equivalent/kg are prepared.

EXAMPLE 1

In a 1.5 liter polymerization flask, 845 g of diglycidyl ether of bisphenol A having an epoxide content of 5.4 equivalent/kg are mixed at 30° to 60° C. with 465 mg of the catalyst prepared according to Example D and dissolved in 2 to 3 ml of methanol with stirring. The temperature is then raised to 100° C. while stirring the mixture, and 215 g of bisphenol A are added and dissolved. The mixture is heated to 170° C., and a further 215 g of bisphenol A are added. The reaction is carried out at 180° C. and a partial vacuum of 500 mbar. After 3.5 hours, the advanced epoxy resin has reached the desired epoxide content of 0.59 equivalent/kg, enabling the resin melt to be discharged, cooled and comminuted. The viscocity of the resin measured in butyl carbitol at 25° C. and a solids content of 40% with a Hoepler viscometer is 2240 mPa.s for the blank value. After a 4 hour (h) thermal treatment of the epoxy resin at 180° C., the epoxide content is 0.54 equivalent/kg, and the advanced epoxy resin has a viscosity of 2850 mPa.s. The quotient of the viscosity of the resin after thermal treatment to the viscosity prior to the thermal treatment (blank value) gives the viscosity build-up factor, which is a measure of the quality of the advanced resin.

EXAMPLE 2

An advanced epoxy resin is prepared by the method of Example 1, using the following compounds:

845 g of diglycidyl ether of bisphenol A, epoxide content= 5.4 equivalent/kg, 407 g of bisphenol A, and 423 mg of the catalyst according to Example C. Reaction conditions=4 h at 180° C. The resulting advanced epoxy resin has the following properties:

| | |
|---|---|
| Epoxide content, blank | = 0.60 equivalent/kg |
| Epoxide content after 4 h at 180° C. | = 0.54 equivalent/kg |
| Viscosity, blank | = 2660 mPa.s |
| Viscosity after 4 h at 180° C. | = 3050 mPa.s |
| Viscosity build-up factor | = 1.15 ± 0.07 |
| | (after 5 repeats). |

EXAMPLE 3

An advanced epoxy resin is prepared by the method of Example 1, using the following compounds:

845 g of diglycidyl ether of bisphenol A, epoxide content= 5.4 equivalent/kg, 416 g of bisphenol A, and 592 mg of the catalyst according to Example A. Reaction conditions=3 h at 180° C. The resulting advanced epoxy resin has the following properties:

| | |
|---|---|
| Epoxide content, blank | = 0.59 equivalent/kg |
| Epoxide content after 4 h at 180° C. | = 0.54 equivalent/kg |
| Viscosity, blank | = 2500 mPa.s |
| Viscosity after 4 h at 180° C. | = 2920 mPa.s |
| Viscosity build-up factor | = 1.17 ± 0.03 |
| | (after 5 repeats). |

EXAMPLE 4

An advanced epoxy resin is prepared by the method of Example 1, using the following compounds:

845 g of diglycidyl ether of bisphenol A, epoxide content= 5.4 equivalent/kg, 433 g of bisphenol A, and 760 mg of the catalyst according to Example A. Reaction conditions=4.5 h at 180° C. The resulting advanced epoxy resin has the following properties:

| | |
|---|---|
| Epoxide content, blank | = 0.59 equivalent/kg |
| Epoxide content after 4 h at 180° C. | = 0.51 equivalent/kg |
| Viscosity, blank | = 2570 mPa.s |
| Viscosity after 4 h at 180° C. | = 3340 mPa.s |
| Viscosity build-up factor | = 1.3. |

EXAMPLE 5

An advanced epoxy resin is prepared by the method of Example 1, using the following compounds:

845 g of diglycidyl ether of bisphenol A, epoxide content= 5.4 equivalent/kg, 422 g of bisphenol A, and 507 mg of the catalyst according to Example G. Reaction conditions=4 h at 180° C. The resulting advanced epoxy resin has the following properties:

| | |
|---|---|
| Epoxide content, blank | = 0.59 equivalent/kg |
| Epoxide content after 4 h at 180° C. | = 0.53 equivalent/kg |
| Viscosity, blank | = 2830 mPa.s |
| Viscosity after 4 h at 180° C. | = 3900 mPa.s |
| Viscosity build-up factor | = 1.3. |

EXAMPLE 6

An advanced epoxy resin is prepared by the method of Example 1, using the following compounds:

845 g of diglycidyl ether of bisphenol A, epoxide content= 5.4 equivalent/kg, 418 g of bisphenol A, and 676 mg of the catalyst according to Example F. Reaction conditions=3.5 h at 180° C. The resulting advanced epoxy resin has the following properties:

| | |
|---|---|
| Epoxide content, blank | = 0.59 equivalent/kg |
| Epoxide content after 4 h at 180° C. | = 0.53 equivalent/kg |
| Viscosity, blank | = 3030 mPa.s |
| Viscosity after 4 h at 180° C. | = 3880 mPa.s |
| Viscosity build-up factor | = 1.3. |

EXAMPLE 7

An advanced epoxy resin is prepared by the method of Example 1, using the following compounds:

845 g of diglycidyl ether of bisphenol A, epoxide content= 5.4 equivalent/kg, 417 g of bisphenol A, and 676 mg of the catalyst according to Example E. Reaction conditions=4 h at 180° C. The resulting advanced epoxy resin has the following properties:

| | |
|---|---|
| Epoxide content, blank | = 0.59 equivalent/kg |
| Epoxide content after 4 h at 180° C. | = 0.55 equivalent/kg |
| Viscosity, blank | = 2950 mPa.s |
| Viscosity after 4 h at 180° C. | = 3660 mPa.s |
| Viscosity build-up factor | = 1.2. |

EXAMPLE 8

An advanced epoxy resin is prepared by the method of Example 1, using the following compounds:

845 g of diglycidyl ether of bisphenol A, epoxide content= 5.4 equivalent/kg, 413 g of bisphenol A, and 507 mg of the catalyst according to Example H. Reaction conditions=4 h at 180° C. The resulting advanced epoxy resin has the following properties:

| | |
|---|---|
| Epoxide content, blank | = 0.59 equivalent/kg |
| Epoxide content after 4 h at 180° C. | = 0.51 equivalent/kg |
| Viscosity, blank | = 2800 mPa.s |
| Viscosity after 4 h at 180° C. | = 3580 mPa.s |
| Viscosity build-up factor | = 1.3. |

EXAMPLE 9

An advanced epoxy resin is prepared by the method of Example 1, using the following compounds:

845 g of diglycidyl ether of bisphenol A, epoxide content= 5.4 equivalent/kg, 407 g of bisphenol A, and 507 mg of the catalyst according to Example I. Reaction conditions=4 h at 180° C. The resulting advanced epoxy resin has the following properties:

| | |
|---|---|
| Epoxide content, blank | = 0.57 equivalent/kg |
| Epoxide content after 4 h at 180° C. | = 0.52 equivalent/kg |
| Viscosity, blank | = 2640 mPa.s |
| Viscosity after 4 h at 180° C. | = 3340 mPa.s |
| Viscosity build-up factor | = 1.3. |

EXAMPLE 10

An advanced epoxy resin is prepared by the method of Example 1, using the following compounds:

845 g of diglycidyl ether of bisphenol A, epoxide content= 5.4 equivalent/kg, 419 g of bisphenol A, and 507 mg of the catalyst according to Example J. Reaction conditions=3 h at 180° C. The resulting advanced epoxy resin has the following properties:

| | |
|---|---|
| Epoxide content, blank | = 0.58 equivalent/kg |
| Epoxide content after 4 h at 180° C. | = 0.54 equivalent/kg |
| Viscosity, blank | = 3800 mPa.s |
| Viscosity after 4 h at 180° C. | = 5050 mPa.s |
| Viscosity build-up factor | = 1.3. |

EXAMPLE 11

An advanced epoxy resin is prepared by the method of Example 1, using the following compounds:

845 g of diglycidyl ether of bisphenol A, epoxide content= 5.4 equivalent/kg, 329 g of bisphenol A, and 211 mg of the catalyst according to Example B. Reaction conditions=2.5 h at 180° C. The resulting advanced epoxy resin has the following properties:

| | |
|---|---|
| Epoxide content, blank | = 1.14 equivalent/kg |
| Epoxide content after 4 h at 180° C. | = 1.35 equivalent/kg |
| Viscosity, blank | = 510 mPa.s |
| Viscosity after 4 h at 180° C. | = 615 mPa.s |
| Viscosity build-up factor | = 1.2. |

EXAMPLE 12

An advanced epoxy resin is prepared by the method of Example 1, using the following compounds:

600 g of diglycidyl ether of bisphenol A, epoxide content= 5.4 equivalent/kg, 322 g of bisphenol A, and 420 mg of the catalyst according to Example B. Reaction conditions=3 h at 180° C. The resulting advanced epoxy resin has the following properties:

| | |
|---|---|
| Epoxide content, blank | = 0.41 equivalent/kg |
| Epoxide content after 4 h at 180° C. | = 0.38 equivalent/kg |
| Viscosity, blank | = 3980 mPa.s |
| Viscosity after 4 h at 180° C. | = 5100 mPa.s |
| Viscosity build-up factor | = 1.3. |

EXAMPLE 13

An advanced epoxy resin is prepared by the method of Example 1, using the following compounds:

300 g of diglycidyl ether of bisphenol A, epoxide content= 5.4 equivalent/kg dissolved in 54 g of cyclohexanone, 183 g of bisphenol A, and 240 mg of the catalyst according to Example B. Reaction conditions=4 h at 180° C. After the reaction, the reaction mixture is diluted with 670 g of 1-methoxypropyl acetate (polymer content=40% ). This solution containing the advanced epoxy resin has the following properties:

| | |
|---|---|
| Epoxide content, blank | = 0.06 equivalent/kg* |
| Epoxide content after 4 h at 180° C. | = 0.05 equivalent/kg* |
| Viscosity, blank | = 2720 mPa.s |
| Viscosity after 4 h at 180° C. | = 3030 mPa.s |
| Viscosity build-up factor | = 1.1. |

*calculated for 100% pure advanced epoxy resin.

EXAMPLE 14

An advanced epoxy resin is prepared by the method of Example 1, using the following compounds:

845 g of diglycidyl ether of bisphenol A, epoxide content= 5.4 equivalent/kg, 432 g of bisphenol A, and 680 mg of the catalyst according to Example K. Reaction conditions=4 h at 180° C. The resulting advanced epoxy resin has the following properties:

| | |
|---|---|
| Epoxide content, blank | = 0.59 equivalent/kg |
| Epoxide content after 4 h at 180° C. | = 0.52 equivalent/kg |
| Viscosity, blank | = 2130 mPa.s |
| Viscosity after 4 h at 180° C. | = 2840 mPa.s |
| Viscosity build-up factor | = 1.3. |

EXAMPLE 15

An advanced epoxy resin is prepared by the method of Example 1, using the following compounds:

845 g of diglycidyl ether of bisphenol A, epoxide content= 5.4 equivalent/kg, 432 mg of bisphenol A, and 680 mg of the catalyst according to Example L. Reaction conditions=3 h at 180° C. The resulting advanced epoxy resin has the following properties:

| | |
|---|---|
| Epoxide content, blank | = 0.58 equivalent/kg |
| Epoxide content after 4 h at 180° C. | = 0.53 equivalent/kg |
| Viscosity, blank | = 2410 mPa.s |
| Viscosity after 4 h at 180° C. | = 3110 mPa.s |
| Viscosity build-up factor | = 1.3. |

EXAMPLE 16

An advanced epoxy resin is prepared by the method of Example 1, using the following compounds:

845 g of diglycidyl ether of bisphenol A, epoxide content= 5.4 equivalent/kg, 432 g of bisphenol A, and 680 mg of the catalyst according to Example M. Reaction conditions=3.5 h at 180° C. The resulting advanced epoxy resin has the following properties:

| | |
|---|---|
| Epoxide content, blank | = 0.59 equivalent/kg |
| Epoxide content after 4 h at 180° C. | = 0.52 equivalent/kg |

EXAMPLE 17

An advanced epoxy resin is prepared by the method of Example 1, using the following compounds:

845 g of diglycidyl ether of bisphenol A, epoxide content= 5.4 equivalent/kg, 432 g of bisphenol A, and 680 mg of the catalyst according to Example N. Reaction conditions=4 h at 180° C. The resulting advanced epoxy resin has the following properties:

| | |
|---|---|
| Epoxide content, blank | = 0.59 equivalent/kg |
| Epoxide content after 4 h at 180° C. | = 0.54 equivalent/kg |
| Viscosity, blank | = 2560 mPa.s |
| Viscosity after 4 h at 180° C. | = 3340 mPa.s |
| Viscosity build-up factor | = 1.3. |

EXAMPLE 18

An advanced epoxy resin is prepared by the method of Example 1, using the following compounds:

845 g of diglycidyl ether of bisphenol A, epoxide content= 5.4 equivalent/kg, 432 g of bisphenol A, and 680 mg of the catalyst according to Example O. Reaction conditions=4 h at 180° C. The resulting advanced epoxy resin has the following properties:

| | |
|---|---|
| Epoxide content, blank | = 0.59 equivalent/kg |
| Epoxide content after 4 h at 180° C. | = 0.54 equivalent/kg |
| Viscosity, blank | = 2090 mPa.s |
| Viscosity after 4 h at 180° C. | = 2800 mPa.s |
| Viscosity build-up factor | = 1.3. |

Use Example

The following components are mixed to give a coating composition for cans which is applied in a known manner to aluminium (Al) and tinplate (TP).

| | |
|---|---|
| Resin according to Example 12 (50% in 70:20:10 1-methoxy-2-propanol/1-methoxy-2-propyl acetate/methyl isobutyl ketone) | 70.0 parts by weight |
| BAKELITE ® 100* (cresol resol resin; 50% in butanol) | 30.0 parts by weight |
| Phosphoric acid, 10% 1-methoxy-2-propanol | 2.5 parts by weight |
| PLASTOPAL ® EBS 600 B** (urea/formaldehyde resin etherified with butanol, 25% in butanol) | 2.0 parts by weight |
| Solvent mixture comprising 1-methoxy-2-propanol/1-methoxy-2-propyl acetate/methyl isobutyl ketone (70:20:10) | 26.0 parts by weight |
| Ready-to-use roller coating composition | 132.5 parts by weight |
| Flow time, DIN cup 4, 20° (DIN 53211) | = 70 s |
| Solids content | = 38% by weight |

Coatings performance test:

| | | |
|---|---|---|
| a) Film thickness, base: aluminium | = 15–20 μm | |
| Cross-hatch test (DIN 53151) | = Gt 0 | |
| Impact test (impact on back, 2 kp from a height of 80 cm, ball diameter 2 cm) | | |
| [Rating][1) | = 3 (few long hairline cracks) | |
| ERICHSEN indentation (DIN 53156) | = 8.3 mm | |
| Mandrel bending test 180°, mandrel $\phi$ = 1 mm | = o.k. | |
| 20 acetone rubs ⇆ [rating][1) | = 2 (difficult to scratch) | |
| b) Base: Al and TP | | |
| Film thickness | = about 5 μm | |
| | Al | TP |
| Bend impact test (ERICHSEN, type 471, length of the corrosion line starting from bend point) | = 1.0 | 1.5 cm |
| Can production (Weingarten high-speed press, number of faulty edges) | = 3 | 2 |
| Cupping test (ERICHSEN, type 224/II) [rating][1) | = 0 | 0 (no change) |
| Beading (beading tester ERICHSEN, type 227, beading depth: 0.5 mm [rating][1) | = 0 | 0 (no change |

*BAKELNE 100: from Bakelite GmbH
**PLASTOPAL EBS 600: from BASF
Stoving conditions: 10 minutes at 205° C.
[1)]Rated by DIN 53230 on a scale from 0–5

What is claimed is:

1. An epoxy resin composition which is liquid at room temperature and has on average more than one epoxy group per molecule, comprising an advancement catalyst which is a perhydroazepinium salt of the formula I

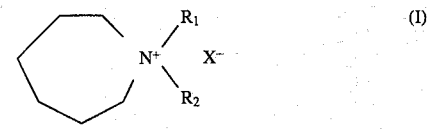

or an octahydroazocinium salt of the formula II

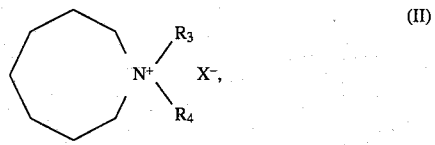

in which $R_1$, $R_2$, $R_3$ and $R_4$ are $C_1$–$C_8$alkyl and X is a halogen atom.

2. An epoxy resin composition according to claim 1, comprising diglycidyl compounds having a molecular weight by weight average of less than 3500.

3. An epoxy resin composition according to claim 1, comprising a perhydroazepinium salt of the formula I or an octahydroazocinium salt of the formula II, in which $R_1$ and $R_2$ are identical and are each $C_1$–$C_8$alkyl, $R_3$ and $R_4$ are identical and are each $C_1$–$C_8$alkyl, and X is a halogen atom.

4. An epoxy resin composition according to claim 3, comprising a perhydroazepinium salt of the formula I or an octahydroazocinium salt of the formula II in which $R_1$ and $R_2$ are identical and are each methyl, ethyl, 1-propyl or 1-n-butyl, $R_3$ and $R_4$ are identical and are each methyl, ethyl, 1-propyl or 1-n-butyl, and X is bromine or iodine.

5. An epoxy resin composition according to claim 1, comprising a perhydroazepinium salt of the formula I.

6. An epoxy resin composition according to claim 5, comprising, as the perhydroazepinium salt of the formula I, N,N-dimethylperhydroazepinium iodide, N,N-diethylperhydroazepinium iodide, N,N-dipropylperhydroazepinium iodide, N-n-butyl-N-ethylperhydroazepinium bromide or N-n-butyl-N-n-propylperhydroazepinium iodide.

7. An epoxy resin composition according to claim 1, comprising additionally a compound having two phenolic hydroxyl groups.

8. An epoxy resin composition according to claim 7, comprising a bisphenol as the compound having two phenolic hydroxyl groups.

* * * * *